US009389954B2

(12) United States Patent
Pelley et al.

(10) Patent No.: US 9,389,954 B2
(45) Date of Patent: Jul. 12, 2016

(54) MEMORY REDUNDANCY TO REPLACE ADDRESSES WITH MULTIPLE ERRORS

(71) Applicant: Freescale Semiconductor, Inc., Austin, TX (US)

(72) Inventors: Perry H. Pelley, Austin, TX (US); George P. Hoekstra, Austin, TX (US); Ravindraraj Ramaraju, Round Rock, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 211 days.

(21) Appl. No.: 14/190,949

(22) Filed: Feb. 26, 2014

(65) Prior Publication Data

US 2015/0242269 A1     Aug. 27, 2015

(51) Int. Cl.
*G11C 29/00*      (2006.01)
*G11C 29/44*      (2006.01)
*G06F 11/20*      (2006.01)
*G06F 11/10*      (2006.01)

(52) U.S. Cl.
CPC .................................. *G06F 11/1048* (2013.01)

(58) Field of Classification Search
CPC ...... G11C 29/44; G11C 7/1006; G11C 29/12; G11C 29/42; G06F 11/2094; G06F 11/1048
See application file for complete search history.

(56) References Cited

U.S. PATENT DOCUMENTS

| | | | |
|---|---|---|---|
| 6,202,180 B1 * | 3/2001 | Nose ....................... | G11C 29/76 365/200 |
| 7,187,602 B2 * | 3/2007 | Wohlfahrt ........... | G06F 11/1008 365/145 |
| 7,376,877 B2 * | 5/2008 | Quach ................. | G06F 11/1064 711/108 |
| 7,386,771 B2 | 6/2008 | Shuma | |
| 8,095,836 B2 | 1/2012 | Eguchi et al. | |
| 8,527,807 B2 * | 9/2013 | Gladwin ............ | G11B 20/1252 714/54 |
| 8,726,071 B2 * | 5/2014 | Gladwin ............ | G11B 20/1252 714/54 |
| 2005/0081093 A1 * | 4/2005 | Joly ....................... | G11C 15/00 714/6.13 |
| 2009/0132876 A1 | 5/2009 | Freking et al. | |
| 2010/0107037 A1 * | 4/2010 | Pelley, III ........... | G06F 11/1064 714/763 |
| 2013/0173970 A1 * | 7/2013 | Kleveland ............. | G11C 29/44 714/710 |
| 2014/0015651 A1 * | 1/2014 | Ur .......................... | A63F 13/28 340/407.1 |
| 2014/0247516 A1 * | 9/2014 | Gladwin ............ | G11B 20/1252 360/49 |

OTHER PUBLICATIONS

Schober "Memory Built-in Self-Repair using Redundant Words," ITcC international Test Conference, 2001.
P. Pelley et al., U.S. Appl. No. 14/152,926, filed Jan. 10, 2014, entitled Memory ECC with Hard and Soft Error Detection and Management.

* cited by examiner

Primary Examiner — Phung M Chung

(57) ABSTRACT

A method and apparatus are provided for error correction of a memory by using a first memory (18), second memory (14), and redundant memory (19) to perform error correction code (ECC) processing on data retrieved from the first memory (18) by using the redundant memory (19) to replace entries in the second memory (14) having repeat addresses, thereby freeing entries in the second memory (14) for use in detecting and managing errors identified by the ECC processing.

20 Claims, 3 Drawing Sheets

MEMORY REDUNDANCY TO REPLACE ADDRESSES WITH MULTIPLE ERRORS

BACKGROUND OF THE INVENTION

1. Field of the Invention

The present invention is directed in general to memory devices and methods for operating same. In one aspect, the present invention relates to memory systems having error correction and methods of operating those systems.

2. Description of the Related Art

In memory systems, data elements or locations in memory can become defective over time. Such defects can be detected and repaired during the manufacturing process (i.e., at time zero) and during normal operation by using error correction code (ECC) systems wherein a content addressable memory (CAM) is used to provide error correction for a memory where the CAM provides a redundant memory for use in replacing locations in memory that have been found to be defective. But with large memories, such as DRAM and SRAM memory, having increasing defects with age, the number of requested CAM entries can exceed the capacity of the CAM.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

Figure 1:
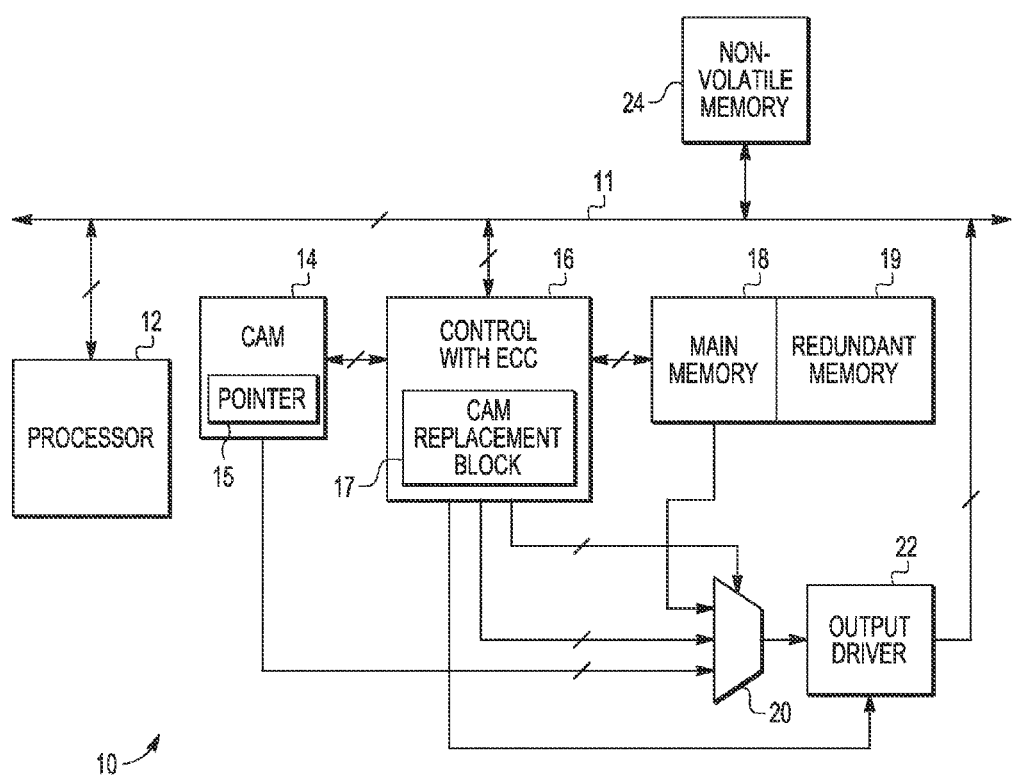
FIG. 1 illustrates a simplified block diagram of an ECC memory system having redundant memory in accordance with selected embodiments of the present disclosure.

A method and apparatus are described for an improved ECC memory system with redundant memory for replacing addresses with multiple errors to address various problems in the art where various limitations and disadvantages of conventional solutions and technologies will become apparent to one of skill in the art after reviewing the remainder of the present application with reference to the drawings and detailed description provided herein. In selected embodiments, an ECC memory system is described which uses a content addressable memory (CAM) and a main memory to provide error detection and management. Data is normally stored in the bits of a word line of the memory which can be accessed by supplying an address. When an address supplied to a CAM matches an address in the CAM, the data associated with the address is supplied by the CAM. In the ECC memory system, the CAM is used as a redundant memory for use in replacing locations in memory that have been found to be defective, and includes storage (for holding CAM entries comprising address, corrected data, and one or more additional status bits) and a pointer to the first unused or least recently used (LRU) entry. The CAM addresses may each comprise a high order addresses and lower order addresses. A high order address may point to a set data segments, such as words or bytes, each one of which has its own lower order address. In one example, the ECC memory system performs ECC at the byte level and the corrected data is one byte of the data. The high order addresses are word line addresses and the lower order addresses are byte addresses, where the ECC memory system performs ECC at the byte level and the corrected data is corrected from one byte of the data stored in the bits of a word line. The word line comprises bit cells, a plurality of which may store a byte of data. Any of the bit cells of a byte has the potential to fail. When a failure occurs, the bit cells of the defective byte must be replaced with a CAM entry for storing corrected data. In this example, the remaining memory location on the word line may not be defective and may be used in a normal way. When the word line is accessed, the defective data byte is replaced with the corrected data byte in the CAM. In other embodiments, the high order address might point to a block, a sub-block, an array, or some other predetermined portion of a memory. When a threshold number of CAM entries is detected, the CAM is scanned to identify any high order addresses that occur multiple times in the CAM. Multiple entries in the CAM with the same high order address may occur when a plurality of data segment within the set pointed to by the high order address have failed and have been replaced in the CAM. For example, a byte of data from bits on a word line might be found to be in error, resulting in the address and corrected data entered into the CAM, and later a second byte of data from bits on the same word line might be found to be in error resulting in that address and corrected data entered into the CAM. Both of the example CAM entries would have the same high order (word line) address. If a recurring high order address is detected, a redundant array element is activated for the recurring address, replacing both example entries in the CAM, and data from the memory array at the identified address is corrected by the data from the CAM and written to the activated redundant array element. In that way, a single redundant array element in the memory can be used to replace a plurality of entries in the CAM freeing those entries for reuse. In selected embodiments, the data from the redundant array element may be read-verified using error correction coding or by comparing the write data to the newly read data. Once replaced with the redundant array element, the CAM entries at the identified address may be removed from the CAM, thereby increasing the CAM capacity. On the other hand, if there are no recurring high order addresses detected in the CAM, one or more CAM entries are chosen using predetermined selection criteria, and then transferred to one or more activated redundant array elements using the address(es) from the selected CAM entry (or entries) to store the corresponding data from the memory array as corrected by the data from the CAM. As will be appreciated, activation of the redundant array elements may be scheduled on a predetermined basis (e.g., the next available predetermined time, such as DRAM refresh, power down, or sector programming/erase, or block transfer) when the processor is already treating the memory as inactive. By using redundant memory array elements to replace duplicate CAM entries for failures with permanent redundancy, the life and reliability of the memory system is extended.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified block diagrams and flow charts illustrating design and operational details of a memory device without including every device feature or aspect in order to avoid limiting or obscuring the present invention. Such descriptions and representations are used by those skilled in the art to describe and convey the substance of their work to others skilled in the art, and the omitted details which are well known are not considered necessary to teach one skilled in the art of how to make or use the present invention. Some portions of the detailed descriptions provided herein are also presented in terms of algorithms and instructions that operate on data that is stored in a computer memory. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of hardware or a computer system or a similar electronic computing device, that manipulates and transforms data represented as physical (electronic) quantities within registers and memories into other data similarly represented as physical quantities within the memories or registers or other such information storage, transmission or display devices.

Turning now to FIG. 1, there is shown a simplified block diagram of an ECC memory system 10 having redundant memory in accordance with selected embodiments of the present disclosure. The disclosed ECC memory system 10 includes a system interconnect 11, a processor 12 coupled to system interconnect 11, and a control circuit 16 coupled to system interconnect 11. In addition, a non-volatile memory 24 is coupled to the system interconnect 11. Connected to the control circuit 16 is a content addressable memory (CAM) 14 having a pointer 15 for identifying the first unused or least recently used (LRU) entry; a memory array 18 and redundant memory array 19; and a multiplexer 20 coupled to CAM 14, memory array 18, redundant memory array 19, and an output driver 22 coupled to the control logic circuit 16. Memory array 18 is preferably organized in rows and columns to be addressed for read and write operations. In similar fashion, the redundant memory array 19 is organized in rows and columns, and may be activated to re-route addresses from the memory array 18 for read and write operations, such as by selecting an available redundant array element in the redundant memory array 19 and re-routing the defective memory word address to the selected redundant memory array 19 location address. The redundant memory 19 may be a unified block as shown in FIG. 1, or in other embodiments may be distributed within memory 18.

Control circuit 16 includes circuitry for running error correction code (ECC) to identify and repair errors in the data stored in the memory array 18. Control circuit 16 also includes CAM replacement control circuit or block 17 for replacing duplicative CAM data entries or other identified entries with a redundant memory element in the redundant memory array 19. The CAM replacement control circuitry 17 is configured to determine the number of CAM entries in the CAM 14, determine whether the number of CAM entries is equal to a predetermined threshold value, identify any reoccurring addresses within a predetermined portion of the stored addresses in the CAM 14, and if so, replace entries containing the identified reoccurring addresses with a redundant memory element in the redundant memory array 19. To this end, control circuit 16 controls operation of CAM 14, memory array 18, redundant memory array 19, multiplexer 20, and output driver 22 in response to instructions provided by processor 12 through system interconnect 11.

In performing a read at an address in which there is a location in memory array 18 that corresponds to the address, generally the data is provided from memory 18 at the address location. Error correction is performed as needed. When correction is performed on data at a particular address, the address and corrected data is loaded into CAM 14. The location in CAM 14 replaces the location in memory 18 for reading and writing. Data is presented to multiplexer 20 from the main memory array 18 in the most common case, from control circuit 16 when error correction is performed, and from CAM 14 when the data to be provided is from a location in CAM that has replaced a location in memory array 18. Output driver 22 receives the data presented to multiplexer 20 as selected by control logic 16. Output driver 22 outputs the received data to system interconnect 1. Data may be retrieved from memory array 18 in rows but a data location for correcting and storing in CAM 14 can be less than a whole row of memory array 18 to avoid making CAM 14 unnecessarily large.

Over time, the CAM 14, which holds replacement address and data of failures, may fill to a predetermined threshold level or count. In selected embodiments, the threshold level or count may be a programmable or adjustable value, and/or may be set by a threshold circuit in the CAM replacement block 17. Once the threshold level or count is reached, the CAM 14 is scanned to detect reoccurring addresses within a predetermined portion of the stored addresses in the CAM 14. The CAM address scan may be performed by circuitry on control logic included in the CAM replacement block 17 or in the CAM 14. Upon detecting that the CAM 14 stores addresses that recur multiple times, the CAM replacement block 17 activates an array redundant element in a redundant memory array 19 that includes the reoccurring address (if available). In addition, the data from the memory array 18 at the identified address is corrected by the data from the CAM 14, and is then written to the newly activated redundant element in the redundant memory array 19. In selected embodiments, the data from the redundant element may be read verified by ECC, like any other array data. Corrected data from the redundant element will be placed in the CAM 14 and treated as any other CAM data. After transferring duplicate CAM entries to the redundant memory array 19, the entries may then be removed from the CAM 14 by the CAM replacement block 17. In selected embodiments, the removal of CAM entries may entail shifting data in the CAM and/or moving the pointer location. However, if the CAM scan does not detect recurring addresses, the CAM replacement block 17 selects one or more CAM entries using a suitable selection algorithm or criteria. For example, CAM entries may be selected on a "first-in-first-out" or other basis. The selected CAM entry (or entries) may then be transferred by the CAM replacement block 17 to one or more activated redundant array elements in the redundant memory array 19 using the address(es) from the selected CAM entry (or entries) to store the corresponding data from the memory array 18 as corrected by the data from the CAM. In any case, the transfer of any selected CAM entry to the redundant memory array 19 may be scheduled to occur at a specified time when the memory is not active, such as during DRAM refresh, power down, sector programming/erase, or block transfer when the processor is already treating the memory as inactive.

In addition to using the redundant memory array 19 to permanently replace duplicate entries from the CAM 14, other techniques may be used to offload the CAM entries to make room for new failures in the CAM 14 and thereby extend the life and reliability of the memory system 10. For example, the CAM replacement block 17 may be configured at a specified time to program all selected CAM entries from the CAM 14 into redundant array elements in the redundant memory array 19, thereby clearing out the CAM 14. While the programming of selected CAM entries can be triggered using any desired trigger event, the programming may occur periodically or at some other predetermined time, such as when DRAM refresh, power down, sector programming, or block transfer occurs, or when the processor is otherwise treating the memory 18, 19 as inactive. In yet other embodiments, all or part of the CAM data 14 may be written to non-volatile memory 24 at a predetermined event, such as at power down or reset, and then written back to the CAM 14 at power-up or after reset.

Figure 2:
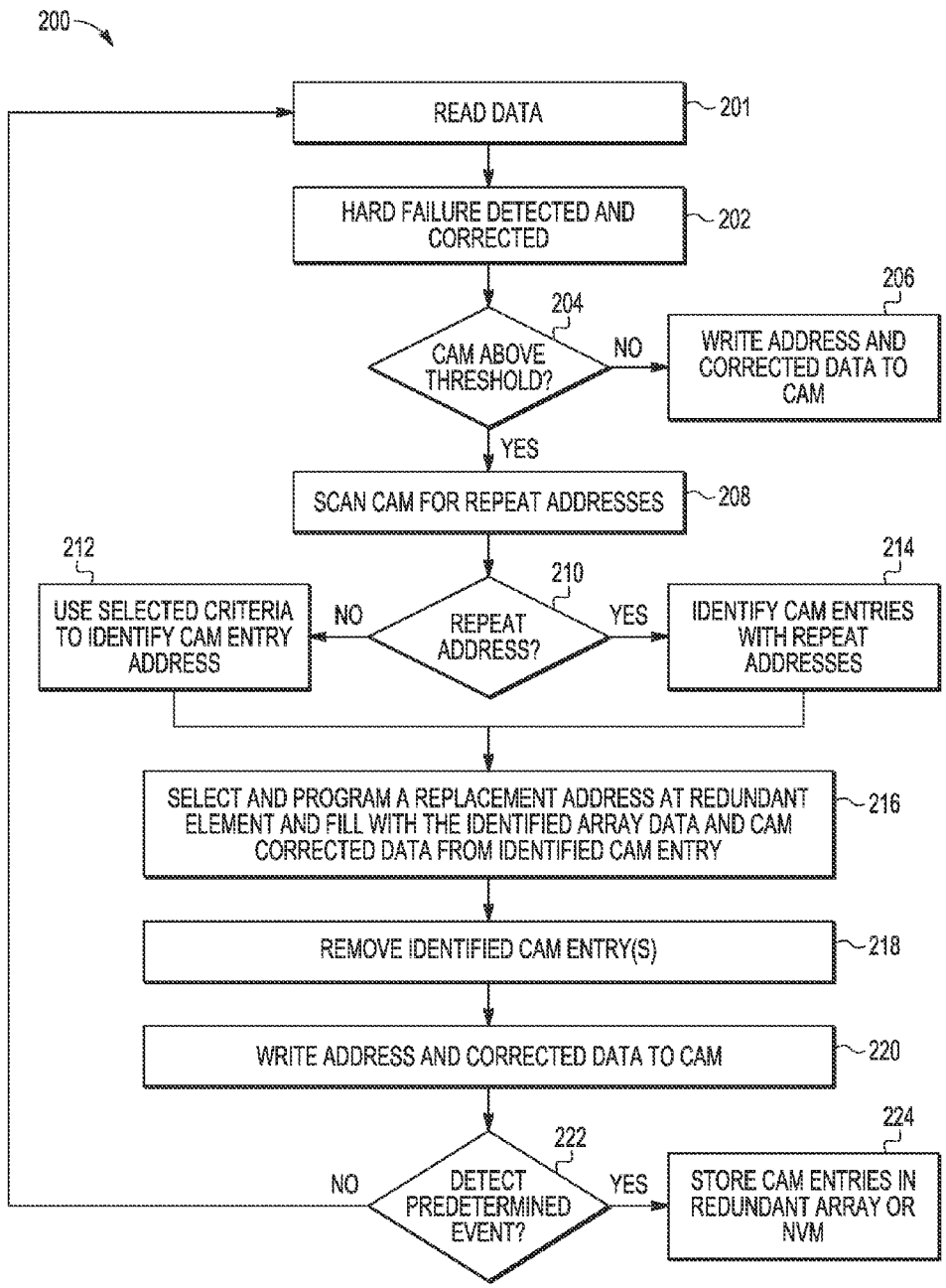
FIG. 2 illustrates a simplified flow chart of a first method for replacing CAM entries with array redundant elements in accordance with selected embodiments of the present disclosure.

FIG. 2 illustrates a simplified flow chart of a method 200 for writing and replacing CAM entries with array redundant elements to process a data segment with an address where an error has been corrected in accordance with selected embodiments of the present disclosure. The disclosed methodology may be used in any memory system with redundant memory that uses content addressable memory to perform error correction, such as the ECC memory system 10 shown in FIG. 1 which performs a read operation (step 201) for a specified address provided by processor 12 on system interconnect 11. As an initial step in the read operation, the control circuit 16 may determine whether there is valid data in CAM 14 at the specified address. If so, the valid data is read from the CAM 14 through the multiplexer 20 and output driver 22 and onto the bus interconnect 11 under control of the control circuit 16. If not, the data is read from memory array 18 at the specified address provided by control logic 16 which performs an ECC check on the retrieved data. Upon determining that there is a correctable error, the control circuit 16 corrects the error at step 202 according to the ECC of logic circuit 16, at which point the corrected output may be output as data through multiplexer 20. In the case of error correction being performed, logic circuit 16 causes multiplexer 20 to select the output from control logic 16 for coupling to output driver 22. However, if the error is uncorrectable, a fault is generated by logic circuit 16 and communicated to processor 12 through system interconnect 11.

After correcting a data error, the logic circuit 16 determines if there is space in the CAM 14 for storing the corrected data to prevent the CAM 14 from overflowing. In selected embodiments, the available CAM space is checked at step 204 by determining if the number of CAM entries is equal to a predetermined threshold value. The available CAM space may be checked by CAM replacement block 17 which compares the number of entries stored in the CAM 14 with a predetermined threshold value that is provided by the processor 12 or otherwise stored at the CAM replacement block 17. In selected embodiments, the threshold detection step 204 may be performed periodically or at any specified time or after each error correction operation by the logic circuit 16 by accessing the CAM 14 to determine how many entries having a predetermined status bit set, and then comparing the total number against a stored threshold value. In other embodiments pointer 15 may be used to indicate the next available CAM entry and if the last entry is indicated the threshold value is detected.

If the number of CAM entries does not meet the threshold value (negative outcome to detection step 204), there is available space in the CAM 14, so the address and corrected data are written to the CAM 14 at step 206. To this end, the logic circuit 16 may upload the specified address and corrected data into a CAM entry 14 and updates any required status bit(s). To select an available CAM entry, the control logic 16 may access the pointer 15 which points to the first unused or least recently used entry in the CAM 14, and then load the specified address and corrected data into the address and data field of the available entry in the CAM 14.

On the other hand, if the number of CAM entries does meet the threshold value (affirmative outcome to detection step 204), this indicates that the CAM 14 is getting full or has otherwise reached a predetermined number of entries. In order to prevent the CAM 14 from overflowing, CAM entries are identified that can be moved to the redundant memory array 19. As an initial identification step, the CAM entries are identified at step 208 by running a scan to detect addresses that occur multiple times in the CAM 14. In some embodiments, only a portion of the address may be scanned. In selected embodiments, the scan step 208 may be performed by the logic circuit 16 which accesses the CAM 14 to detect if there are repeat addresses for any of the CAM entries.

If repeat addresses are found in the CAM 14 (affirmative outcome to detection step 210), the CAM entries with repeat addresses are identified at step 214. The data associated with the CAM entry identified at step 214 is then transferred to a redundant memory array element at step 216 to make space in the CAM 14. In selected embodiments, the data transfer step 216 may be implemented by the CAM replacement block 17 which determines if a redundant element in the redundant memory array 19 is available that includes the repeating address identified at step 214. If so, the CAM replacement block 17 activates the redundant element in the redundant memory array 19 and transfers the data from the memory array 18 at the identified (repeating) address to the activated redundant element. To effect transfer, the data from the array at the address identified at step 214 is corrected by the data from the CAM 14 before being written to the newly activated redundant element at step 218. To transfer the data, the control logic 16 may program the redundant memory array 19 to replace the identified redundant address from memory 18 with a replacement address in the redundant memory array 19, and then load the corrected data into the replacement address at the redundant memory array 19. As will be appreciated, the transfer of data to the redundant memory array 19 may be scheduled to occur at a specified time when the memory 18, 19 is not active, such as during DRAM refresh, power down, sector programming/erase, or block transfer when the processor is already treating the memory as inactive.

In some embodiments after transfer to the redundant memory array 19, the data from the redundant element may be read verified using any desired technique, such as by performing a parity check or by comparing the write data (stored in the redundant element) to the newly read data. After verifying the write operation, the identified CAM entries (e.g., those replaced with redundancy) are then removed from the CAM 14 at step 218, thereby freeing space in the CAM 14. With space freed, the address and corrected data may be written to the CAM 14 at step 220. For example, the logic circuit 16 may upload the specified address and corrected data into a CAM entry 14 and update any required status bit(s).

Again, the access pointer 15 may be used to select an available CAM entry. In other embodiments where the threshold is set below the CAM size, step 206, writing address and corrected data to CAM, occurs before step 204 and replaces step 220.

Referring back to the repeat address detection step 210, if there are no repeat addresses found in the CAM 14 (negative outcome to detection step 210), one or more CAM entries are identified for removal at step 212. The identification step 212 may use any desired selection algorithm or criteria. For example, the CAM replacement block 17 may select one or more CAM entries on a "first-in-first-out" basis. At step 216, the selected CAM entry (or entries) may then be transferred by the CAM replacement block 17 to one or more activated redundant array elements in the redundant memory array 19 using the address from the selected CAM entry (or entries with repeat addresses) to store the corresponding data from the memory array 18 as corrected by the data from the CAM 14. Again, the transfer of any selected CAM entry data to the redundant memory array 19 may be scheduled to occur at a specified time when the memory is not active. Once the transfer of the identified CAM entry to redundant memory is transferred and in some embodiments verified (step 216) and the identified CAM entry is removed (step 218), the freed space in the CAM 14 is available to receive the address and corrected data (step 220). Removing may, in some embodiments, entail shifting entries from other locations in the CAM into the location of CAM entry(s) to be removed and adjusting the pointer. For example, the logic circuit 16 may use the access pointer 15 to upload the specified address and corrected data into an indicated CAM entry 14 and update any required status bit(s).

In addition to using a threshold-based transfer to the redundant memory array 19 to replace selected CAM entries which have repeat addresses or meet other selection criteria such as described hereinabove, the error correction capacity of the memory system may be further extended by transferring all CAM entries to redundant memory when one or more predetermined trigger events occur. In the disclosed methodology 200, a predetermined trigger event is detected at step 222 when the control logic circuit 16 detects that the processor is treating the memory as inactive. Examples of such events include a DRAM refresh operation, power down, sector programming, block transfer, etc. When no trigger event is detected (negative outcome to detection step 222), the methodology returns to await a new read data operation at step 201. However, when a trigger event is detected (affirmative outcome to detection step 222), all selected CAM entries (without reference to repeating addresses) may be programmed into available redundant elements of the redundant memory array 19 at step 224. By transferring data associated with all CAM entries at step 224 to the redundant memory array 19, the CAM 14 has space available to store additional address and data to replace data elements in the memory array 18 having errors. To transfer the data, the control logic 16 may program the redundant memory array 19 to replace the memory 18 addresses from the CAM 14 with replacement addresses in the redundant memory array 19, and then load the corrected data into the replacement addresses at the redundant memory array 19.

In addition or in the alternative, the predetermined trigger event detected at step 222 may be a power down or reset operation, at which point all or part of the CAM data may be written to non-volatile memory at step 224. To transfer the CAM data to non-volatile memory 24, the control logic 16 may program the non-volatile memory 24 to store the CAM entries, including addresses and data. At power up or after reset, the CAM entries in the non-volatile memory 24 are then written back to CAM 14.

Figure 3:
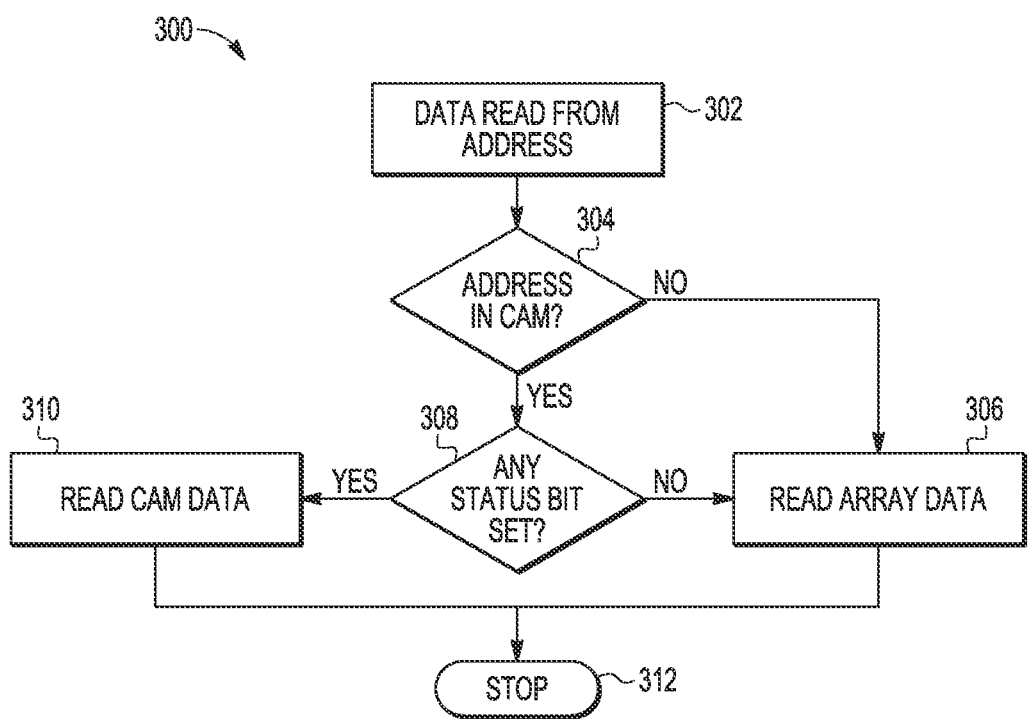
FIG. 3 illustrates a simplified flow chart of a method for reading data from the ECC memory system.

Turning now to FIG. 3, there is shown a simplified flow chart of a method 300 for reading data from the ECC memory system using status bits. As an initial step, data is read from the memory array 18 at step 302 in response to the current address provided by control logic 16. At step 304, it is determined if the current address is in the CAM 14. If the current address is not present in CAM 14 (negative outcome to address detection step 304), the data is read from the memory array 18 or redundant memory array 19 at the current address at step 306. At this point, the redundant memory array 19 may be programmed with a replacement address and corrected data to replace an address in the memory array 18 in the event that the CAM reached a threshold level of entries which included repeat addresses for the current address. The logic control circuit 16 may be used at step 304 to determine if the current address is in the CAM 14. If the current address is stored in the CAM 14 (affirmative outcome to address detection step 304), the logic control circuit 16 may interact with CAM 14 to determine if one or more control status bits (e.g., the write, read, and permanent bits) are set at step 308. If not (negative outcome to status bit detection step 308), this indicates that the corresponding CAM data entry is not being used to replace an error in the memory array, so the data may be read from the memory array 18 at the current address at step 306. However, if the control status bits are set (affirmative outcome to status bit detection step 308), this indicates that the read operation should use the CAM data entry at step 310. At step 312, the read operation ends.

By now it should be appreciated that there is provided herein an error correction method and associated memory apparatus having a first memory (e.g., DRAM or SRAM), second memory, such as a CAM for storing a plurality of entries having an address field and data field, and a redundant memory. In the disclosed methodology, a read operation of the first memory is initiated to retrieve data from a specified address, and an error correction code (ECC) process is performed on the data to detect if the data is erroneous and to provide corrected data. The corrected data may be output to the data processor. After performing the ECC process, a determination is made whether the second memory has exceeded a storage threshold level, such as by detecting if the CAM has a predetermined threshold number of CAM entries stored therein. If the second memory has not exceeded the storage threshold level, the specified address and corrected data are stored in the second memory in an available entry. However, if the second memory has exceeded the storage threshold level, one or more redundant entries from the second memory are transferred to a redundant memory. In selected embodiments, the redundant entry (or entries) in the second memory are identified by scanning the CAM to identify CAM entries having a repeat address. Once identified, the redundant entry (or entries) may be transferred by selecting a CAM entry comprising CAM entry data to be written to a redundant element of the first memory and a CAM entry address, activating an available redundant element in the redundant memory to be addressed by a first portion of the CAM entry address, writing corrected CAM entry data to the redundant element in the redundant memory at a second portion CAM entry address, writing selected data not requiring correction to the redundant element from the first memory from an address corresponding to the first portion of the CAM entry address, and removing each CAM entry having the first portion of the CAM entry address from the CAM. After freeing space in the CAM, the corrected data may be output to the data processor. In accordance with selected embodiments, all entries from the second memory may be transferred to the redundant memory upon detecting a predetermined event where the first memory and redundant memory are inactive. In other embodiments, all entries from the second memory may be transferred to a non-volatile memory upon detecting a predetermined power down or reset event.

In another form, there is provided a memory and associated method of operation. In the disclosed memory, a first memory is organized in an array of rows and columns for addressing data read and write operations. In addition, a second memory (e.g., a CAM) is organized as a plurality of entries for storing data, each entry having an address value and corrected data. There is also a spare memory having one or more redundant elements for storing data at a specified address. In selected embodiments, the spare memory is formed in a redundant memory region of the first memory. The memory also includes an error correction control (ECC) circuit for performing error correction on data stored in the first memory at a specified address to generate corrected data, and for storing the corrected data and specified address in an entry in the second memory. In addition, the memory includes a circuit coupled to the second memory and spare memory that is configured to detect if the second memory has exceeded a storage threshold level, and to transfer one or more redundant entries from the second memory to the spare memory when the second memory has exceeded the storage threshold level. The circuit may include control logic for detecting if the second memory has a predetermined threshold number of CAM entries. The control logic may also identify one or more entries in the second memory for transfer to a redundant element of the spare memory by scanning the second memory to identify CAM entries having a repeat address. To transfer redundant entries from the second memory to the spare memory, the circuit may be configured to select a CAM entry from the second memory comprising CAM entry data to be written to a redundant element of the spare memory and a CAM entry address; to activate a redundant element in the spare memory to be addressed by a first portion of the CAM entry address; and to write corrected CAM entry data to the redundant element in the spare memory at a second portion CAM entry address. In selected embodiments, the circuit is configured to transfer one or more redundant entries from the second memory to the spare memory by transferring all entries from the second memory to the spare memory upon detecting a predetermined event where the first memory and spare memory are inactive. In other embodiments, the circuit is configured to all entries from the second memory to a non-volatile memory upon detecting a predetermined power down or reset event.

In another form, there is provided a system and associated method of operation. The disclosed system includes a random access memory (RAM) array and a content addressable memory (CAM) array. In addition, the system includes an address decoder for initiating a read operation of the RAM array to retrieve data from a specified address. The system also includes control circuitry for performing an error correction code (ECC) process on data retrieved from the RAM array to detect if the data is erroneous, to provide corrected data, and to store the specified address and corrected data to the CAM array. In addition, the system includes a CAM replacement circuit for detecting if the CAM array has exceeded a storage threshold level and transferring one or more redundant entries from the CAM array to a spare memory when the CAM array has exceeded the storage threshold level by scanning the CAM array to identify CAM entries having a repeat address.

Although the described exemplary embodiments disclosed herein are directed to various ECC memory systems and method for using redundant memory to replace one or more CAM entries having repeat addresses, the present invention is not necessarily limited to the example embodiments which illustrate inventive aspects of the present invention that are applicable to a wide variety of information processing systems and circuits. Thus, the particular embodiments disclosed above are illustrative only and should not be taken as limitations upon the present invention, as the invention may be modified and practiced in different but equivalent manners apparent to those skilled in the art having the benefit of the teachings herein. For example, although FIG. 1 and the discussion thereof describe an exemplary information processing architecture, this exemplary architecture is presented merely to provide a useful reference in discussing various aspects of the invention, and is not intended to be limiting so that persons of skill in the art will understand that the principles taught herein apply to other types of devices. For example, selected embodiments may implement the illustrated elements of system 10 on a single integrated circuit or within a single device. Alternatively, system 10 may include any number of separate integrated circuits or separate devices interconnected with each other. For example, processor 12 may be on a different integrated circuit than the other circuit elements shown in FIG. 1. In yet other embodiments, the redundant memory that is described as a CAM may be considered beneficial, but other memory types and other schemes for implementing the redundancy may be found to be effective. Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising." or any other variation thereof, are intended to cover a non-exclusive inclusion, such that a process, method, article, or apparatus that comprises a list of elements does not include only those elements but may include other elements not expressly listed or inherent to such process, method, article, or apparatus. In addition, the term "coupled." as used herein, is not intended to be limited to a direct coupling or a mechanical coupling. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method comprising:
    initiating a read operation of a first memory to retrieve data from a specified address;
    performing an error correction code (ECC) process on the data to detect if the data is erroneous and to provide corrected data;
    detecting if a second memory has exceeded a storage threshold level;
    storing the specified address and corrected data in the second memory in an available entry when the second memory has not exceeded the storage threshold level; and
    transferring one or more redundant entries from the second memory to a redundant memory when the second memory has exceeded the storage threshold level.

2. The method of claim 1, wherein the first memory is one of either a dynamic random access memory (DRAM) or a static random access memory (SRAM).

3. The method of claim 1, where the second memory comprises a content addressable memory (CAM) for storing a plurality of entries, each comprising an address field and data field.

4. The method of claim 1, where detecting if the second memory has exceeded the storage threshold level comprises detecting if a content addressable memory (CAM) has a predetermined threshold number of CAM entries.

5. The method of claim 4, further comprising identifying the one or more entries in the second memory for transfer to a redundant element of the first memory by scanning the CAM to identify CAM entries having a repeat address.

6. The method of claim 4, further comprising,
    selecting a CAM entry comprising CAM entry data to be written to a redundant element of the first memory and a CAM entry address;
    activating a redundant element in the redundant memory to be addressed by a first portion of the CAM entry address; and
    writing corrected CAM entry data to the redundant element in the redundant memory at a second portion CAM entry address.

7. The method of claim 6, further comprising writing selected data not requiring correction to the redundant element from the first memory from an address corresponding to the first portion of the CAM entry address.

8. The method of claim 6, further comprising removing each CAM entry having the first portion of the CAM entry address.

9. The method of claim 1, further comprising outputting the corrected data to a data processor.

10. The method of claim 1, further comprising transferring all entries from the second memory to the redundant memory upon detecting a predetermined event where the first memory and redundant memory are inactive.

11. The method of claim 1, further comprising transferring all entries from the second memory to a non-volatile memory upon detecting a predetermined power down or reset event.

12. A memory comprising:
    a first memory organized in an array of rows and columns for addressing data read and write operations;
    a second memory organized as a plurality of entries for storing data, each entry comprising an address value and corrected data;
    a spare memory comprising one or more redundant elements for storing data at specified addresses;
    an error correction control circuit for performing error correction on data stored in the first memory at a specified address to generate corrected data, and for storing the corrected data and specified address in an entry in the second memory; and
    a circuit coupled to the second memory and spare memory that is configured to detect if the second memory has exceeded a storage threshold level, and to transfer one or more redundant entries from the second memory to the spare memory when the second memory has exceeded the storage threshold level.

13. The memory of claim 12, where spare memory is formed in a redundant memory region of the first memory.

14. The memory of claim 12, where the second memory comprises a content addressable memory (CAM).

15. The memory of claim 14, where the circuit further comprises control logic for detecting if the second memory has a predetermined threshold number of CAM entries.

16. The memory of claim 15, where the circuit further comprises control logic for identifying one or more entries in the second memory for transfer to a redundant element of the spare memory by scanning the second memory to identify CAM entries having a repeat address.

17. The memory of claim 14, where the circuit is configured to transfer one or more redundant entries from the second memory to the spare memory by selecting a CAM entry from the second memory comprising CAM entry data to be written to a redundant element of the spare memory and a CAM entry address, activating a redundant element in the spare memory to be addressed by a first portion of the CAM entry address, and writing corrected CAM entry data to the redundant element in the spare memory at a second portion CAM entry address.

18. The memory of claim 12, where the circuit is configured to transfer one or more redundant entries from the second memory to the spare memory by transferring all entries from the second memory to the spare memory upon detecting a predetermined event where the first memory and spare memory are inactive.

19. The memory of claim 12, where the circuit is configured to all entries from the second memory to a non-volatile memory upon detecting a predetermined power down or reset event.

20. A system comprising:
    a random access memory (RAM) array;
    a content addressable memory (CAM) array;
    an address decoder for initiating a read operation of the RAM array to retrieve data from a specified address;
    control circuitry for performing an error correction code (ECC) process on data retrieved from the RAM array to detect if the data is erroneous, to provide corrected data, and to store the specified address and corrected data to the CAM array; and
    a CAM replacement circuit for detecting if the CAM array has exceeded a storage threshold level by scanning the CAM array to identify CAM entries having a repeat address, where the CAM replacement circuit transfers one or more redundant entries from the CAM array to a spare memory when the CAM array has exceeded the storage threshold level.

\* \* \* \* \*